United States Patent
Yun et al.

(10) Patent No.: US 10,138,918 B2
(45) Date of Patent: Nov. 27, 2018

(54) FASTENING DEVICE

(71) Applicant: Jangpyoung Construction Co., LTD., Seoul (KR)

(72) Inventors: Young-Su Yun, Seoul (KR); Byeong-Kwan Na, Incheon (KR)

(73) Assignee: Jangpyoung Construction Co., Ltd., Seoul (KR)

( * ) Notice: Subject to any disclaimer, the term of this patent is extended or adjusted under 35 U.S.C. 154(b) by 219 days.

(21) Appl. No.: 14/817,479

(22) Filed: Aug. 4, 2015

(65) Prior Publication Data
US 2016/0040704 A1    Feb. 11, 2016

(30) Foreign Application Priority Data
Aug. 5, 2014    (KR) .................. 10-2014-0100463

(51) Int. Cl.
| | | |
|---|---|---|
| *F16B 19/10* | (2006.01) | |
| *F16B 13/06* | (2006.01) | |
| *F16B 29/00* | (2006.01) | |
| *F16B 5/06* | (2006.01) | |

(52) U.S. Cl.
CPC ........ *F16B 13/061* (2013.01); *F16B 19/1072* (2013.01); *F16B 29/00* (2013.01); *F16B 5/0642* (2013.01)

(58) Field of Classification Search
CPC . F16B 13/061; F16B 19/1045; F16B 19/1072
USPC ............................................. 411/34, 38, 43
See application file for complete search history.

(56) References Cited

U.S. PATENT DOCUMENTS

| | | | | | |
|---|---|---|---|---|---|
| 2,236,079 | A | * | 3/1941 | Wipper ................. | F16B 13/061 411/38 |
| 2,652,741 | A | * | 9/1953 | Ketchum ............ | F16B 19/1063 411/43 |
| 3,365,998 | A | * | 1/1968 | Zahodiakin ............. | F16B 19/10 411/183 |
| 4,376,604 | A | * | 3/1983 | Pratt ................... | F16B 19/1063 411/34 |

(Continued)

FOREIGN PATENT DOCUMENTS

| | | |
|---|---|---|
| JP | 55-086107 | 6/1980 |
| JP | 2084793 | 1/1994 |

(Continued)

*Primary Examiner* — Flemming Saether
(74) *Attorney, Agent, or Firm* — Hunter E. Webb; Keohane & D'Alessandro, PLLC

(57) ABSTRACT

In general, embodiments of the present invention relate to fastening device assemblies. Specifically, the present invention provides a fastening device configured to couple a first object with a second object. A first coupling member shaped substantially like a bolt with a bolt head and a shaft. The shaft is inserted into a through hole in the first object and second object. A second coupling member having a head portion and a cylindrical body portion is coupled with the first coupling member. The first coupling member passes through a cylindrical hollow rotating member. An expanding member having a cylindrical hollow shape and arranged between the second coupling member and the rotating member is configured to expand to couple the first object and the second object between the head portion of the second coupling member and the expanding member.

9 Claims, 10 Drawing Sheets

(56) References Cited

U.S. PATENT DOCUMENTS

| | | | | |
|---|---|---|---|---|
| 4,752,169 A * | 6/1988 | Pratt | .................... | F16B 19/1063 |
| | | | | 411/43 |
| 4,967,463 A * | 11/1990 | Pratt | .................... | F16B 19/1054 |
| | | | | 29/525.06 |
| 4,968,198 A * | 11/1990 | Binns | ................. | F16B 19/1063 |
| | | | | 411/38 |
| 5,350,264 A * | 9/1994 | Stencel | ............... | F16B 19/1063 |
| | | | | 411/38 |
| 6,273,655 B1 * | 8/2001 | McAlpine | ........... | F16B 13/0841 |
| | | | | 411/34 |
| 7,150,596 B2 * | 12/2006 | Diaz | ......................... | F16B 5/02 |
| | | | | 411/21 |
| 8,444,354 B2 * | 5/2013 | Nielsen | ............... | F16B 19/1054 |
| | | | | 411/351 |
| 9,464,654 B2 * | 10/2016 | Pratt | .................... | F16B 19/1063 |
| 2010/0068001 A1 * | 3/2010 | Khalil | ................. | F16B 19/1054 |
| | | | | 411/43 |

FOREIGN PATENT DOCUMENTS

| | | |
|---|---|---|
| JP | 09-189316 | 7/1997 |
| JP | 2012057653 | 3/2012 |
| JP | 2012-026536 | 9/2012 |
| KR | 1020050078831 | 8/2005 |
| KR | 1020110061179 | 6/2011 |

* cited by examiner

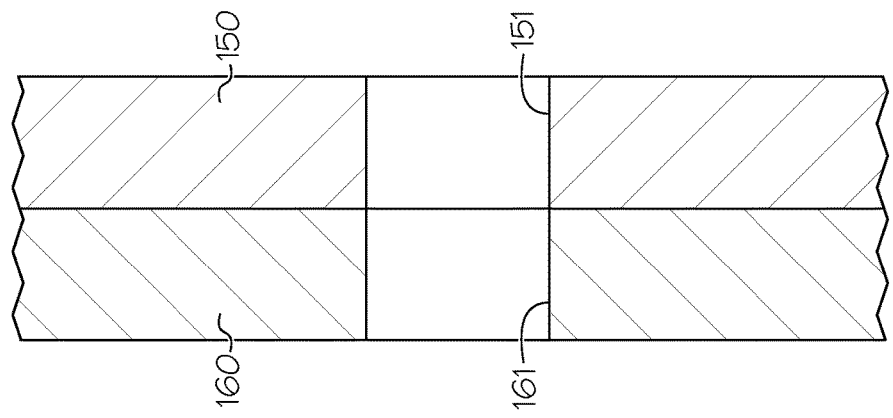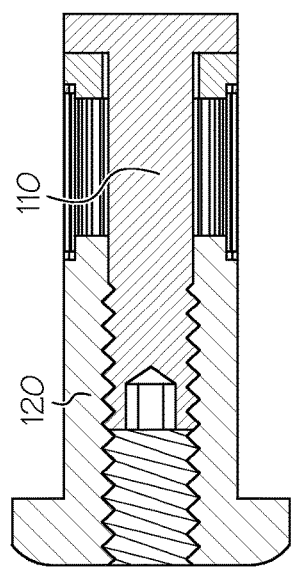
FIG. 5

FASTENING DEVICE

CROSS-REFERENCE TO RELATED APPLICATION

This application claims the benefit of Korean patent application No. 10-2014-0100463 filed Aug. 5, 2014.

TECHNICAL FIELD

The present invention relates to a fastening device. Specifically, the present invention relates to a fastening device that enables coupling between two objects even as the worker can do work on only one side of the object.

BACKGROUND

Typically, bolts are used for the assembly of two or more unthreaded objects (e.g., panels, wooden boards, drywall, etc.) with the aid of a nut. To couple two object, each object includes a hole and the bolt is inserted through the holes in each of the objects. The holes are formed to have the approximate diameter as that of the shaft of the bolt. Then, the nut is coupled to the end of the shaft of the bolt that is exposed to the outside of the second object and is fastened, allowing the first object to be coupled with the second object as a single body.

With such a conventional coupling structure, work may be done only when a worker can access both the bolt and the nut when coupling the two objects. However, in some work environments, the worker may not be able to access the outside of each object with his hand or tool. In this case, fastening devices such as bolts and nuts cannot be used.

SUMMARY

In general, embodiments of the present invention relate to fastening device assemblies. Specifically, the present invention provides a fastening device configured to couple a first object with a second object. A first coupling member shaped substantially like a bolt with a bolt head and a shaft. The shaft is inserted into a through hole in the first object and second object. A second coupling member having a head portion and a cylindrical body portion is coupled with the first coupling member. The first coupling member passes through a cylindrical hollow rotating member. An expanding member having a cylindrical hollow shape and arranged between the second coupling member and the rotating member is configured to expand to couple the first object and the second object between the head portion of the second coupling member and the expanding member.

One aspect of the present invention provides a fastening device configured to couple a first object with a second object, comprising: a first coupling member shaped substantially like a bolt having a bolt head and a shaft, wherein the shaft of the first coupling member is inserted into a first through hole in the first object and a second through hole in the second object; a second coupling member having a head portion and a cylindrical body portion, wherein the first coupling member is coupled with second coupling member with the bolt head of the first coupling member opposed to the head portion of the second coupling member; a rotating member having a first end and a second end, wherein the first end is arranged nearest to the second coupling member and the second end is arranged nearest to the first coupling member, wherein the rotating member has a cylindrical hollow shape so that the shaft of the first coupling member passes through the rotating member; and an expanding member having a cylindrical hollow shape and arranged between the cylindrical body portion of the second coupling member and the first end of the rotating member, wherein the expanding member is configured to expand to couple the first object and the second object between the head portion of the second coupling member and the expanding member.

A second aspect of the present invention provides a method for coupling a first object with a second object, comprising: providing a first coupling member shaped substantially like a bolt having a bolt head and a shaft, wherein the shaft of the first coupling member is inserted into a first through hole in the first object and a second through hole in the second object; providing a second coupling member having a head portion and a cylindrical body portion, wherein the first coupling member is coupled with second coupling member with the bolt head of the first coupling member opposed to the head portion of the second coupling member; providing a rotating member having a first end and a second end, wherein the first end is arranged nearest to the second coupling member and the second end is arranged nearest to the first coupling member, wherein the rotating member has a cylindrical hollow shape so that the shaft of the first coupling member passes through the rotating member; providing an expanding member having a cylindrical hollow shape and arranged between the cylindrical body portion of the second coupling member and the first end of the rotating member; and expanding the expanding member the first object and the second object between the head portion of the second coupling member and the expanding member to couple the first object with the second object.

BRIEF DESCRIPTION OF THE DRAWINGS

These and other features of this invention will be more readily understood from the following detailed description of the various aspects of the invention taken in conjunction with the accompanying drawings in which:

FIG. 5 is a cross-sectional view illustrating an example in which a fastening device is a at a front side of a first panel and a second panel according to an embodiment of the present invention;

Figure 1:
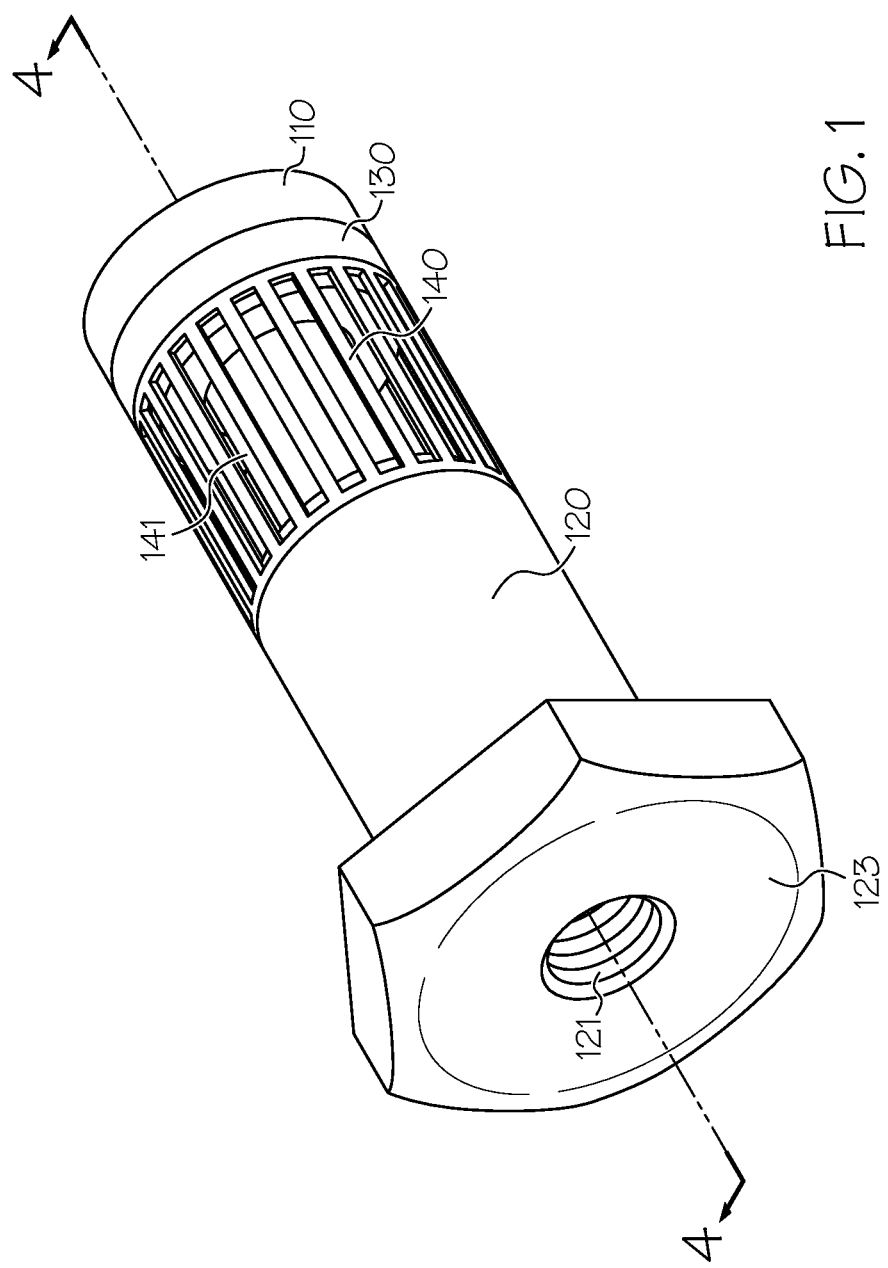
FIG. 1 is a perspective view illustrating a fastening device according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to fastening device assemblies. Specifically, the present invention provides a fastening device configured to couple a first object with a second object. A first coupling member shaped substantially like a bolt with a bolt head and a shaft. The shaft is inserted into a through hole in the first object and second object. A second coupling member having a head portion and a cylindrical body portion is coupled with the first coupling member. The first coupling member passes through a cylindrical hollow rotating member. An expanding member having a cylindrical hollow shape and arranged between the second coupling member and the rotating member is configured to expand to couple the first object and the second object between the head portion of the second coupling member and the expanding member.

Figure 2:
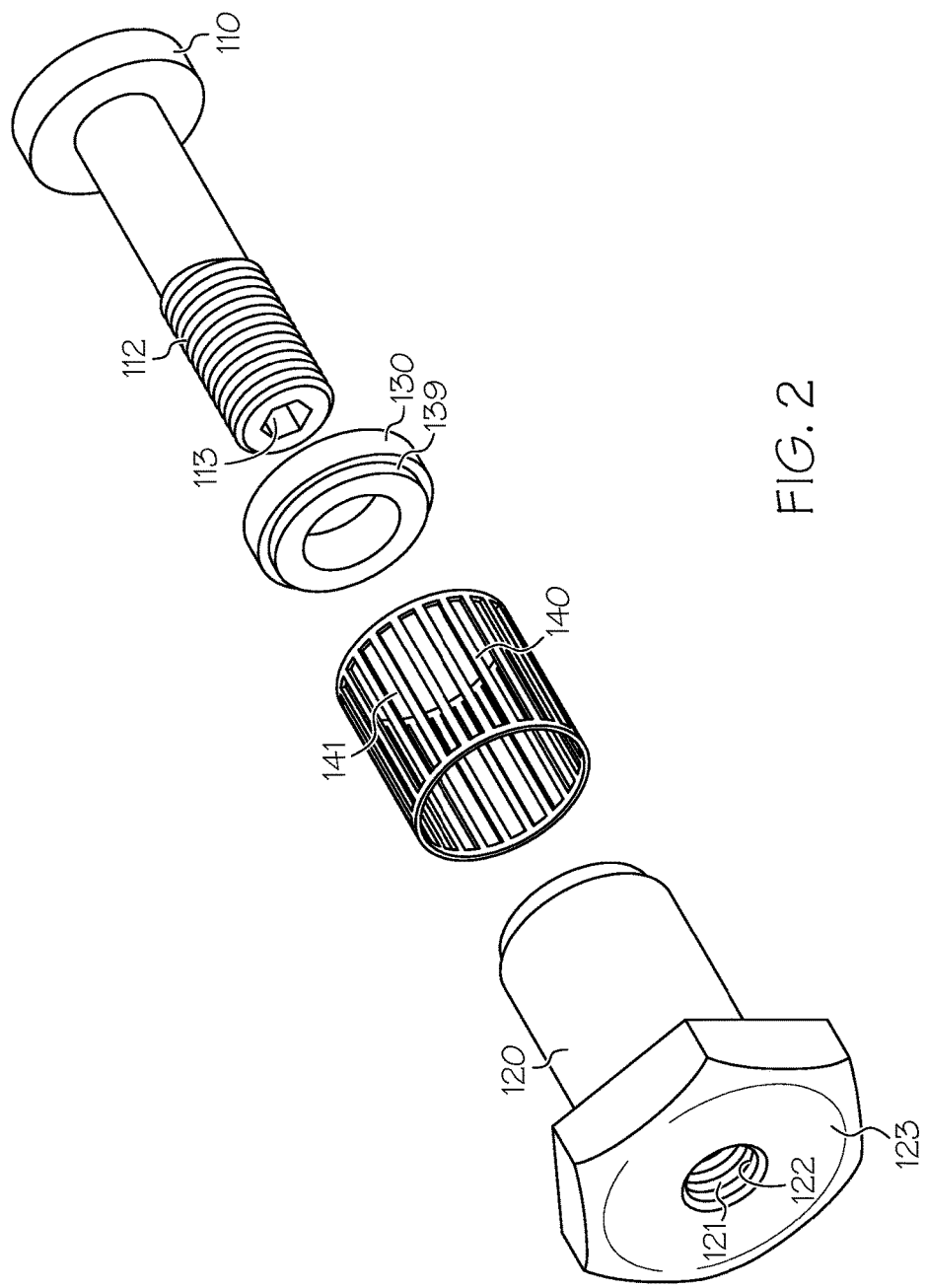
FIG. 2 is an exploded perspective view illustrating the fastening device as viewed in a first direction according to an embodiment of the present invention.
Figure 3:
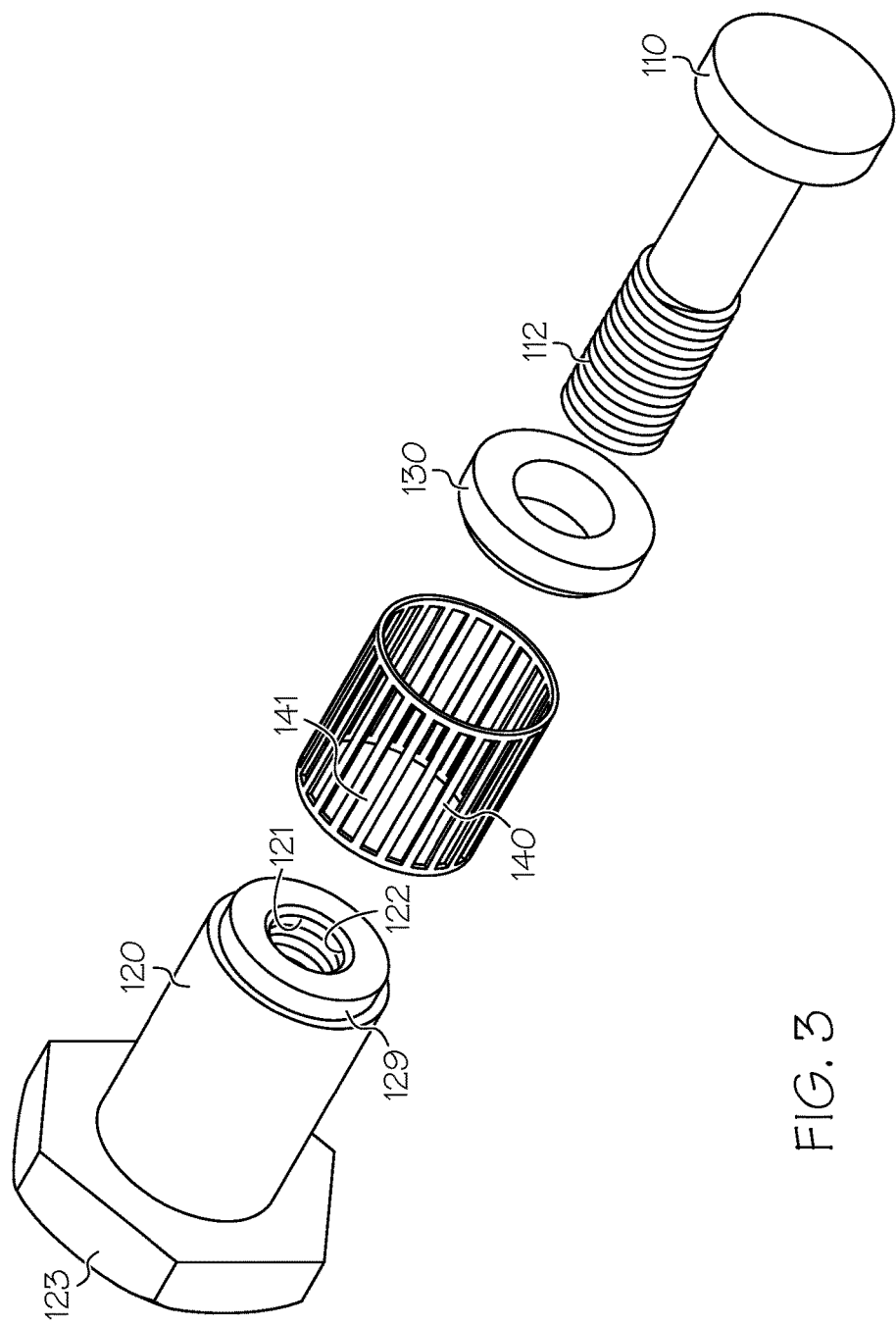
FIG. 3 is an exploded perspective view illustrating the fastening device as viewed in a second direction according to an embodiment of the present invention.
Figure 4:
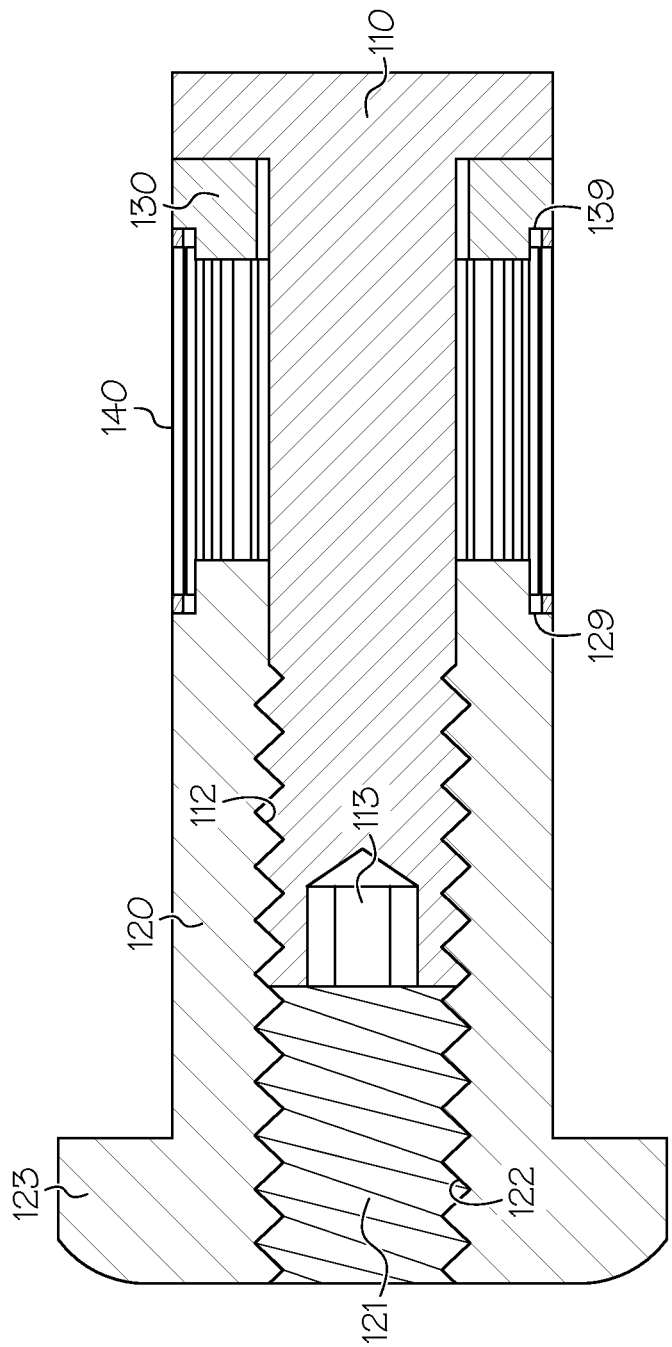
FIG. 4 is a cross-sectional view taken along line A-A' according to an embodiment of the present invention.

With reference to FIGS. 1-4, a fastening device that enables coupling between two objects (e.g., panels) even as the worker can do work on only one side of the panels is disclosed. The fastening device may be made of steel, brass, tin, iron, chrome, or the like. It is contemplated the fastening device will be particularly useful in various construction applications, although those skilled in the art certainly appreciate a wide variety of uses. FIG. 1 is a perspective view illustrating a fastening device according to an embodiment of the present invention. FIG. 2 is an exploded perspective view illustrating the fastening device as viewed in a first direction. FIG. 3 is an exploded perspective view illustrating the fastening device as viewed in second direction. FIG. 4 is a cross-sectional view taken along line A-A'.

Figure 8:
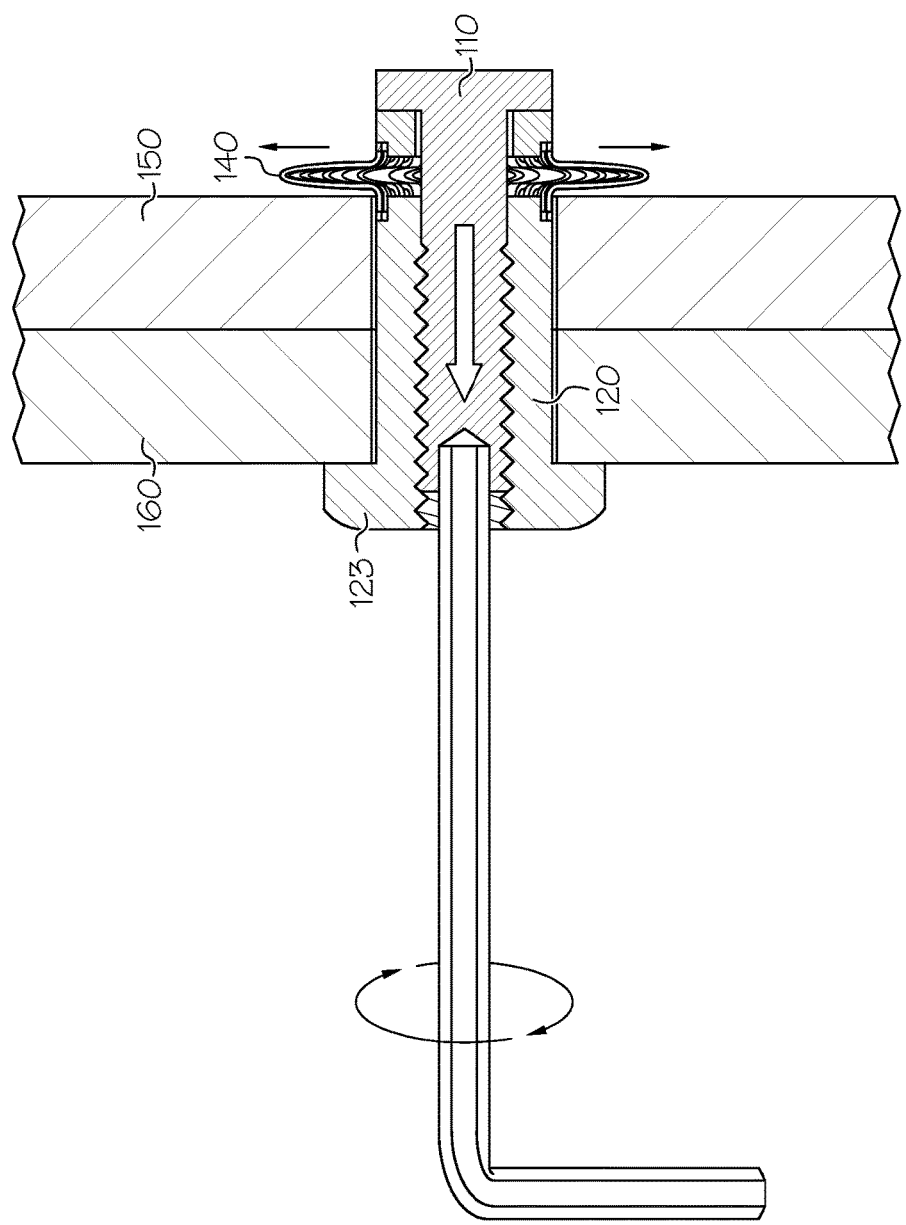
FIG. 8 is a cross-sectional view illustrating an example in which the first coupling member of FIG. 7 is moved to expand an expanding member according to an embodiment of the present invention.

According to the present invention, the fastening device couples a first panel 150 having a first through hole 151 with a second panel 160 having a second through hole 161 so that the first surface of the first panel 150 faces the second surface of the second panel 160 as shown in FIG. 8. The illustrative embodiments are described with respect to coupling two panels. Such descriptions are not intended to be limiting on the embodiments of the invention. Other objects and materials known in the art may be used with the fastening device. As shown in FIGS. 1-4, the fastening device includes a first coupling member 110, a second coupling member 120, a rotating member 130, and an expanding member 140.

The first coupling member 110 is shaped substantially as a bolt having a bolt head and a shaft. The shaft has a first screw thread 112 along its outer circumferential surface. The first screw thread 112 may cover the outer circumferential surface entirely or partially. The second coupling member 120 may include a head portion and a cylindrical body portion. For example, the second coupling member 120 may be shaped substantially as a bolt having bolt head 123 and a shaft. Inside the second coupling member 120 is formed a coupling hole 121 that passes completely through the second coupling member 120.

The shaft of first coupling member 110 is inserted into the coupling hole 121. A second screw thread 122 is formed along an internal circumferential surface of the coupling hole 121 to be engaged with the first screw thread 112. Accordingly, the first coupling member 110 is rotated into the second coupling member 120 while the second coupling member 120 remains stationary. The shaft of first coupling member 110 includes coupler 113. Rotating tool 170 is inserted through coupling hole 121 into coupler 113 to couple first coupling member 110 to second coupling member 120. As the rotating tool 170 coupled to the coupler 113 rotates, the first coupling member 110 is rotated, moving towards the second coupling member 120.

In one example, the rotating tool 170 is formed of a hexagonal wrench, and the coupler 113 is formed of a hexagonal wrench hole through which the hexagonal wrench is inserted. In other examples, rotating tool 170 may be another type of wrench or device configured to perform the rotation of first coupling member 110, such as a combination wrench, monkey wrench, pliers, or the like.

The rotating member 130 includes a first end and a second end, with the first end arranged closer to second coupling member 120 and the second end arranged closer to first coupling member 110. The rotating member 130 has a cylindrical hollow shape and is formed so that the shaft of the first coupling member 110 passes through the rotating member 130. A hole formed in the rotating member 130 is larger in diameter than the shaft of the first coupling member 110, allowing the rotating member 130 to freely rotate around the outer circumferential surface of the first coupling member 110.

The expanding member 140 has a cylindrical hollow shape and is arranged between the shaft of the second coupling member 120 and the first end of the rotating member 130 (i.e., the end nearest the second coupling member 120). Similar to rotating member 130, expanding member 140 includes a first end and a second end, with the first end arranged closer to second coupling member 120 and the second end arranged closer to first coupling member 110.

In embodiments in which rotating member 130 is not provided, the expanding member 140 is arranged between the shaft of the second coupling member 120 and the bolt head of the first coupling member 110. In this embodiment, an example is shown in which the rotating member 130 through which the shaft of the first coupling member 110 passes is arranged between the shaft of the first coupling member 110 and the second end of the expanding member 140. Thus, the expanding member 140 is formed so that the first end is stuck to the shaft of the second coupling member 120, abutting the shaft of the second coupling member 120, and the shaft is stuck to the rotating member 130 abutting the rotating member 130.

The shaft of the second coupling member 120 has a first hanging jaw 129 to which the first end of the expanding member 140 is arranged and stuck, and the first end of the rotating member 130 has a second hanging jaw 139 to which the second end of the expanding member 140 is arranged and stuck. The first hanging jaw 129 is formed to be depressed in a ring shape at the first end of the rotating member 130. The first and second ends of the expanding member 140 are seated on the first hanging jaw 129 and the second hanging jaw 139, respectively. Thus, when an external force is exerted from the first and second ends of the expanding member 140, the first and second ends of the expanding member 140 are supported without being bent inwards, and the central part of the expanding member 140 may be expanded while bent outwards.

As shown, the expanding member 140 may be formed so that its outer circumferential surface is flat from the first end to the second end. However, the outer circumferential surface of the expanding member 140 is slightly curved outwards so that the outer circumferential surface may be bent outwards by an external force applied from the first and second ends.

The first end of the first coupling member 110 passes through the inside of the rotating member 130 and the expanding member 140 and is coupled with the second coupling member 120. The expanding member 140 is crumpled by an external force applied from the first and second ends and is thus expanded in a direction perpendicular to the first and second ends. To accomplish this, the expanding member 140 has multiple, elongated slits 141 formed towards the first and second ends, allowing the expanding member 140 to be more readily crumpled and expanded by the external force in the direction perpendicular to the first and second ends.

Figure 6:
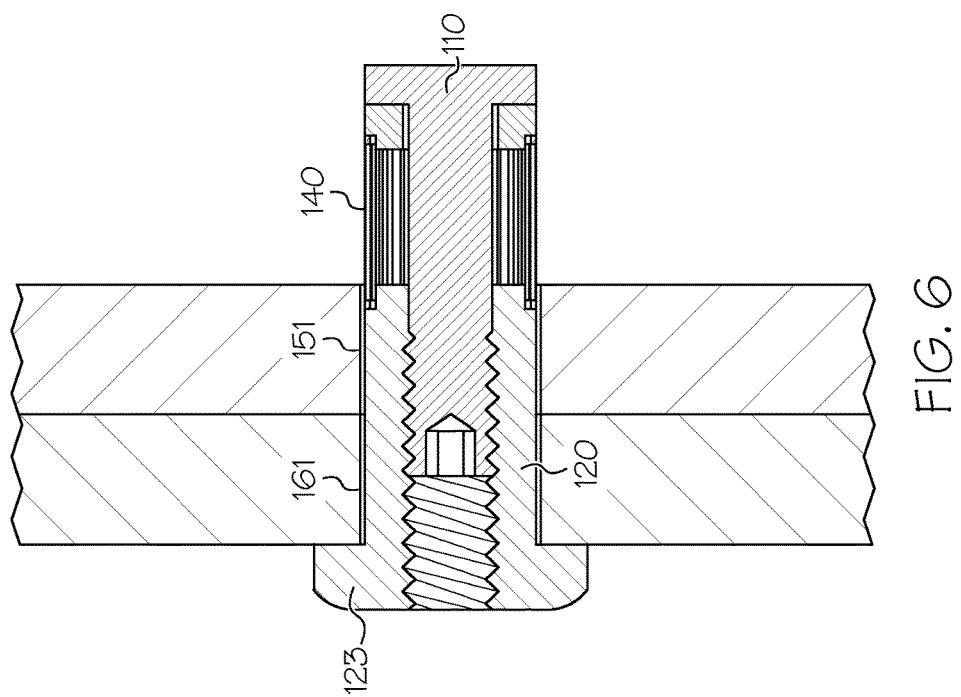
FIG. 6 is a cross-sectional view illustrating an example in which the fastening device of FIG. 5 passes through the first panel and the second panel according to an embodiment of the present invention.
Figure 7:
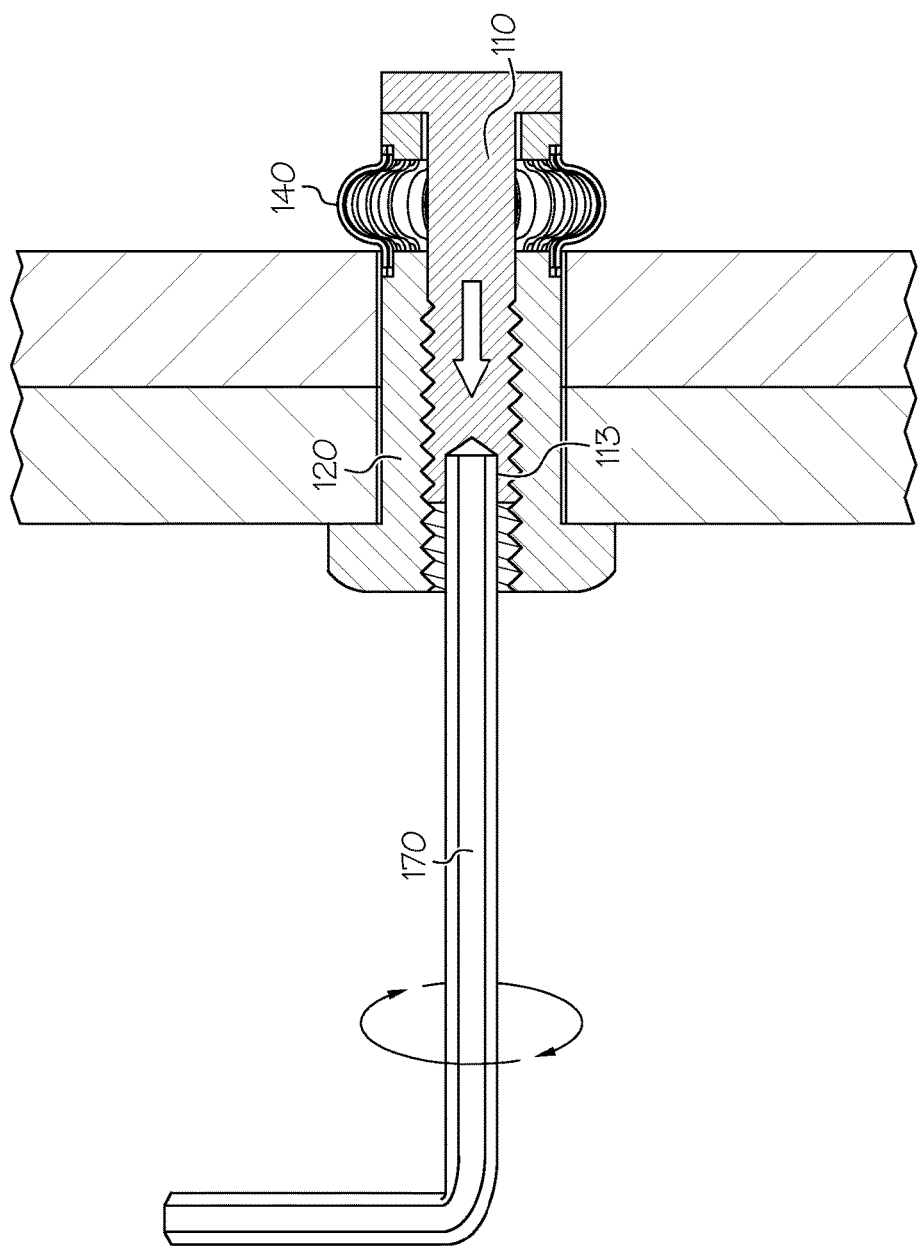
FIG. 7 is a cross-sectional view illustrating an example in which a rotating member is coupled to the first coupling member of FIG. 6 and is rotated according to an embodiment of the present invention.

Now described is a process for coupling a first panel 150 and a second panel 160 together using the present invention having the above-described configuration. FIG. 5 is a cross-sectional view illustrating an example in which a fastening device is arranged at a front side of a first panel 150 and a second panel 160 according to the first embodiment of the present invention. FIG. 6 is a cross-sectional view illustrating an example in which the fastening device of FIG. 5 passes through the first panel 150 and the second panel 160. FIG. 7 is a cross-sectional view illustrating an example in which a rotating member 130 is coupled to the first coupling member 110 of FIG. 6 and is rotated. FIG. 8 is a cross-sectional view illustrating an example in which the first coupling member 110 of FIG. 7 is moved to expand an expanding member 140.

In connection with the present embodiment, the first panel 150 and second panel 160 each having a flat shape are coupled together. The first panel 150 and the second panel 160 have a first through hole 151 and a second through hole 161, respectively. For illustrative purposes, panels having a flat shape are used. However, the fastening device according to the present invention may be used to couple other types of materials and objects having various shapes and sizes. The use of panels is illustrative only and not intended to be limiting.

As shown in FIG. 5, the first through hole 151 of the first panel 150 and the second through hole 161 of the second panel 160 are arranged together to be coupled. The fastening device according to the present invention, in which the first coupling member 110 and the second coupling member 120 are arranged together, is arranged towards an outer surface of the second panel 160. The diameter of the first through hole 151 and the diameter of the second through hole 161 are formed to be equal to or larger than the diameter of the shaft of the second coupling member 120 and the diameter of the expanding member 140 before being expanded.

Accordingly, as shown in FIG. 6, the fastening device may be arranged to pass through the first through hole 151 and the second through hole 161. In this case, a bolt head 123 formed at the bolt head of the second coupling member 120 is larger in size than the second through hole 161. Accordingly, bolt head 123 of the second coupling member 120 is arranged towards the outer surface of the second panel 160.

The shaft of the second coupling member 120 is arranged to pass through the first through hole 151 and the second through hole 161. The shaft of the first coupling member 110 is arranged to pass through the first through hole 151, and the bolt head of the first coupling member 110 is arranged towards the outer surface of the first panel 150. The expanding member 140 is arranged between the rotating member 130 and the first panel 150, while left to pass through the first through hole 151. In such state, the second coupling member 120 is fixed (e.g., by bolt head 123) not to be rotated.

As shown in FIG. 7, the rotating tool 170 is inserted into the coupling hole 121 to be coupled to the coupler 113, and the rotating tool 170 is rotated. As the rotating tool 170 is rotated by an external force rotating the rotating tool 170, the first screw thread 112 and the second screw thread 122 are engaged with each other, so that the first coupling member 110 is moved towards the second coupling member 120. Then, as the first coupling member 110 is moved towards the second coupling member 120, the interval between the second end of the first coupling member 110 and the second end of the second coupling member 120 is reduced, so that the expanding member 140 is expanded in a direction perpendicular to the first through hole 151 between the bolt head of the first coupling member 110 and the outer surface of the first panel 150.

The outer circumferential surface of the expanding member 140 is formed to be slightly curved outwards, allowing the outer circumferential surface of the expanding member 140 to be more readily bent and expanded in the direction perpendicular to the first through hole 151. The first end of the expanding member 140 is stuck and supported by the second coupling member 120, and the second end is stuck and supported by the rotating member 130. Thus, even when the first coupling member 110 is moved towards the second coupling member 120, the expanding member stays at its position without being moved.

The diameter of the expanding member 140 expanded by the external force in the direction perpendicular to the first through hole 151 is gradually increased. Accordingly, as shown in FIG. 8, the expanded diameter of the expanding member 140 and the diameter of the bolt head 123 are rendered to be larger than the diameter of the first through hole 151 and the second through hole 161, so that the first panel 150 and the second panel 160 are coupled with each other by the bolt head 123 and the expanding member 140.

According to the present invention, the fastening device allows for easier coupling between the first panel 150 and the second panel 160 even under the circumstance when a worker can do work at only one side of the panels and cannot put his hand or tool on the other side. Specifically, as described above, the first panel 150 and the second panel 160 respectively have the first through hole 151 and the second through hole 161 through which the first coupling member 110 is arranged to be inserted. The first coupling member 110 is then rotated with the second coupling member 120 fixed, so that the first panel 150 and the second panel 160 may be easily fastened and coupled with each other by the expanding member 140 and the bolt head 123 of the second coupling member 120.

Figure 9:
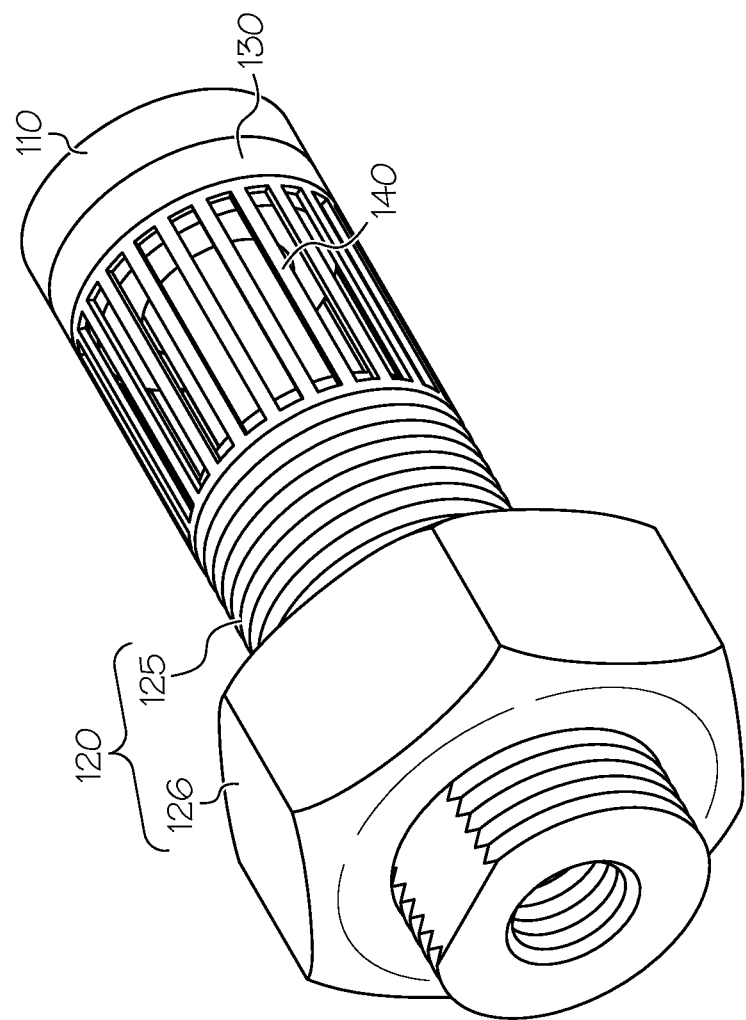
FIG. 9 is a perspective view illustrating a fastening device according to a second embodiment of the present invention.
Figure 10:
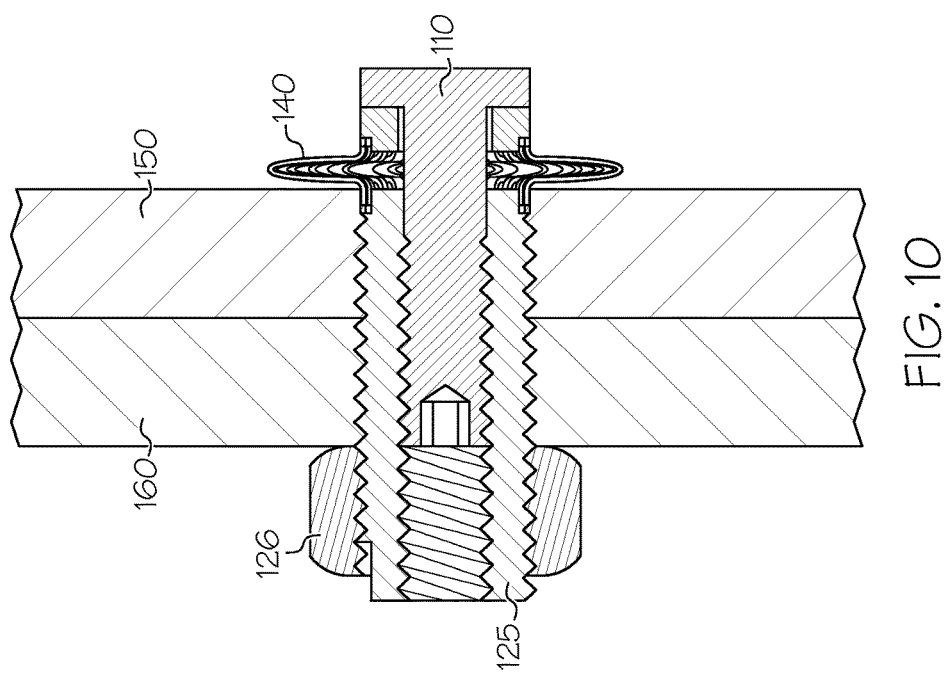
FIG. 10 is a cross-sectional view illustrating a coupling between a first panel and a second panel using a fastening device according to the second embodiment of the present invention.

FIG. 9 is a perspective view illustrating a fastening device according to a second embodiment of the present invention. FIG. 10 is a cross-sectional view illustrating a coupling between a first panel and a second panel using a fastening device according to the second embodiment of the present invention.

According to the second embodiment, the fastening device includes a first coupling member 110, a second coupling member 120, a rotating member 130, and an expanding member 140 as shown in FIGS. 9-10. The second embodiment has a different configuration of the second coupling member 120 than the first embodiment, and the description primarily focuses on the second coupling member 120. In the second embodiment, the second coupling member 120 includes a hollow bolt member 125 and a nut member 126. The hollow bolt member 125 passes through the first through hole 151 and the second through hole 161. The hollow bolt member 125 has a third screw thread along an outer circumferential surface.

The hollow bolt member 125 is screwed along an internal circumferential surface of the first through hole 151 and the second through hole 161 by the third screw thread formed on the outer circumferential surface of the hollow bolt member 125 as shown in FIG. 10. The nut member 126 has a fourth screw thread along an inner circumferential surface which is engaged with the third screw thread. The nut member 126 abuts the first surface of the second panel 160.

In the second embodiment, the hollow bolt member 125 is rotated to allow the third screw thread formed on the outer circumferential surface of the hollow bolt member 125 to be screwed along the inner circumferential surface of the first through hole 151 and the second through hole 161. Thereafter, the first coupling member 110 is rotated with the hollow bolt member 125 held and fixed to expand the expanding member 140. In this case, since the hollow bolt member 125 is screwed and fixed to the inner circumferential surface of the first through hole 151 and the second through hole 161, the expanding member 140 may be easily expanded without movement of the hollow bolt member 125 when the first coupling member 110 is rotated. As the expanding member 140 is fully expanded, the nut member 126 is rotated to more firmly fasten and couple the first panel 150 and the second panel 160 together.

While the inventive concept may include being shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A fastening device configured to couple a first object with a second object, comprising:

a first coupling member shaped substantially like a bolt having a bolt head and a shaft, wherein the shaft of the first coupling member is inserted into a first through hole in the first object and a second through hole in the second object, wherein the shaft of the first coupling member has a first screw thread formed along an outer circumferential surface;

a second coupling member having a head portion and a cylindrical body portion, the cylindrical body portion having a first hanging jaw, wherein the first coupling member is coupled with second coupling member with the bolt head of the first coupling member opposed to the head portion of the second coupling member, wherein the second coupling member includes a coupling hole passing through the second coupling member and the cylindrical body portion has a second screw thread formed along an internal circumferential surface of the coupling hole, wherein the first screw thread is coupled with the coupling hole;

a rotating member having a first end and a second end, the first end of the rotating member having a second hanging jaw, wherein the first end is arranged nearest to the second coupling member and the second end is arranged nearest to the first coupling member, wherein the rotating member has a cylindrical hollow shape so that the shaft of the first coupling member passes through the rotating member; and an expanding member having a cylindrical hollow shape and a first end seated on the first hanging jaw of the cylindrical body portion of the second coupling member and a second end seated on the second hanging jaw of the first end of the rotating member, wherein the expanding member is configured to expand outward, without being bent inward, as the expanding member is compressed by a compaction of the fastening device as a result of a movement of the rotating member toward the second coupling member to couple the first object and the second object between the head portion of the second coupling member and the expanding member.

2. The fastening device of claim 1, wherein the second coupling member is shaped substantially as a bolt, wherein the head portion is a bolt head and the cylindrical body portion is a shaft.

3. The fastening device of claim 1, wherein the head portion of the second coupling member is a nut member and the cylindrical body portion of the second coupling member is a hollow bolt member.

4. The fastening device of claim 1, wherein the first screw is coupled with the coupling hole using a coupling device.

5. The fastening device of claim 4, wherein the coupling device is a wrench.

6. The fastening device of claim 1, wherein the expanding member includes a plurality of elongated slits formed towards the first and second ends to allow the expanding member to be expanded.

7. The fastening device of claim 6, wherein the expanding member is expanded using external force.

8. The fastening device of claim 1, wherein the first coupling member and the second coupling member are composed from at least one of steel, brass, tin, iron, or chrome.

9. The fastening device of claim 1, wherein the first object is one of a panel, wooden board, or drywall.

* * * * *